United States Patent [19]

Nelson

[11] 4,167,584

[45] Sep. 11, 1979

[54] STABLE EMULSIFIED EDIBLE LIQUID STARCH PRODUCT AND METHOD OF MAKING THE SAME

[75] Inventor: Rolland W. Nelson, Des Moines, Iowa

[73] Assignee: Kemin Industries, Inc., Des Moines, Iowa

[21] Appl. No.: 867,809

[22] Filed: Jan. 9, 1978

[51] Int. Cl.$^2$ ............................................. A23K 1/00
[52] U.S. Cl. ........................................ 426/2; 426/53; 426/335; 426/532; 426/623; 426/630; 426/661; 426/807
[58] Field of Search ............... 426/630, 635, 2, 18, 426/28, 44, 48, 52, 53, 56, 807, 69, 602, 607, 335, 532, 661, 623

[56] References Cited

U.S. PATENT DOCUMENTS

| | | | |
|---|---|---|---|
| 3,895,117 | 7/1975 | Backlund | 426/69 |
| 3,901,976 | 8/1975 | Roth et al. | 426/69 |
| 3,917,852 | 11/1975 | Maraulja et al. | 426/52 |
| 3,950,543 | 4/1976 | Buffa et al. | 426/18 |
| 3,988,483 | 10/1976 | Deyoe et al. | 426/635 X |

Primary Examiner—R. B. Penland
Attorney, Agent, or Firm—Zarley, McKee, Thomte, Voorhees & Sease

[57] ABSTRACT

An emulsified liquid starch product which comprises an emulsion of a starch bearing material, which has been cooked, at least partially gelatinized and enzymatically hydrolyzed, the predominant amount of the emulsified particles not exceeding an average particle diameter of 300 microns. In accordance with the process a starch, protein and cellulose material is size reduced, slurried with water, hydrothermically cooked, starch hydrolyzing enzyme is thereafter added, and mixing is continued for a period of time to prevent jelling, but not for such a long period of time that the product becomes thin and watery, and thereafter the product is treated with an enzyme deactivating agent to provide a stable emulsion. Chemical preservatives to prevent mold and spoilage and a flavoring, and coloring agents to improve palatibility and produce uniform color may then be added, and animal or vegetable fat may be added.

18 Claims, No Drawings

STABLE EMULSIFIED EDIBLE LIQUID STARCH PRODUCT AND METHOD OF MAKING THE SAME

BACKGROUND OF THE INVENTION

This invention relates to a liquid starch product suitable for use by livestock and other animals. The product is suitable for use by monogastric animals, such as hogs, chickens, other poultry, ruminants, such as cattle, sheep and goats, and pseudoruminants such as horses, rabbits and the like. In short, the product is a suitable feed or feed supplement for all domesticated animals which are raised as a food source.

While liquid starch products have been prepared in the past, such products have not met with a great deal of commercial success. This has primarily resulted from inherent deficiencies in the product. For example, many previous liquid products have not been suitable because of product instability due to the lack of emulsion stability. These other products also have much of the starch removed. Thus, the products when shipped and stored for a period of time separate into a solids lower layer and an unsightly but distinct top liquid layer. This makes the product unacceptable for use without chemical emulsifiers, stirring and much additional labor cost. As a result, such products have been shied away from by domesticated animal producers.

The product of this invention provides a liquid starch product in an emulsion form which has emulsion stability for periods of time up to as long as nine months, but typically for several months, i.e., three to six months. As a result, the product has good storage properties and a long shelf life.

In addition to the advantage of emulsion stability, good storage capabilities and long shelf life, the product of this invention also has the unique capability of replacing up to as much as 5% to 10% of dry grain in a dry feed ration. It also replaces the pelletizing of feed which is expensive and time consuming without any significant difference in animal weight gain or feed conversion factors being noted. As a result, feed costs can be significantly decreased, by utilizing a cheaper feed product without any corresponding decrease in feed efficiency, since the feed conversion to protein (meat) remains constant.

Accordingly, the principal objects of this invention are to provide a liquid starch based edible product which has a good shelf life, has long storage capability, which is a stable emulsion, and which can effectively be used as a substitute for a portion of dry grain or mechanically pelletizing the diet, thereby decreasing feed costs; and yet the substitution is made without any corresponding decrease in feed efficiency.

The method of accomplishing the above and other objects of the invention will become apparent from the detailed description of the invention which follows.

SUMMARY OF THE INVENTION

This invention relates to a stable emulsified liquid starch product wherein a whole starch bearing material is emulsified, cooked, and at least partially gelatinized and partially enzymatically hydrolyzed with the emulsified particles having a predominant proportion not exceeding 300 microns in average particle diameter.

With regard to the process, the whole starch bearing material is slurried, hydrothermically cooked to gelatinize the starch portion thereof, an enzyme is added to enzymatically hydrolyze part of the cooked starch to sugars, and thereafter the enzyme is deactivated, a chemical preservative is added to prevent mold and spoilage and a flavor is added to improve palatability. Animal or vegetable fat may be added to improve energy values.

While applicants do not wish to be bound by any theory, it is believed that the combination of particle size, the employment of whole starch sources, as opposed to pure or isolated starch, coupled with the gelatinization and partial hydrolyzation to sugars, allows applicants to produce a product of good emulsion stability and feed efficiency equal to dry grains in many respects.

As a result, the liquid product of this invention can be stored for long periods of time, has a good shelf life, will not separate into layers, and can be utilized at a much lower cost as a partial substitute for higher cost, dry grains and pelletized feeds.

DETAILED DESCRIPTION OF THE INVENTION

It is important to note that the starch bearing material which is utilized to make the liquid starch product of this invention is a whole starch bearing material or source material. The term "whole starch material" as used herein, is intended to distinguish from isolated starches wherein a starch source material is segregated into starch materials and non-starch materials. In this invention, the source material is not segregated, and as a result, the whole starch bearing material which is utilized herein includes the starch, as well as fat, cellulose and protein materials.

The exact starch bearing source material utilized in this invention is not critical, as long as it is used in its whole form, and can include conventional grains such as corn, wheat, milo, barley, oats, rye, soybeans, rice, tuber starches such as potatoes, or any other source of starch bearing material.

As an initial pretreatment step, it is preferred that the whole starch bearing material be run through a grain scalper or the like to remove adulterating foreign materials.

In the initial step of the process of this invention, the whole starch source material is size reduced to an average particle size of 300 microns or smaller. The importance of a 300 micron size is that it has been found that if the average particle size is greater than 300 microns, it is impossible to make a stable emulsion of the whole starch bearing material. It should, of course be understood that the particle size can be much smaller than 300 microns if desired. Size reduction of the whole starch source material can be accomplished by conventional means such as a hammer mill, ball mills, conventional grinding, entolators, pin mills, or the like. The important factor not being the precise mechanical means of size reduction, but that the size of the particles be reduced to 300 microns or less.

After the whole starch source material has been sized reduced to a particle size of 300 microns or less, as specified above, starch material is thereafter slurried with an edible liquid, preferably water.

If fat is to be added, from 0.5% to 25% fat by weight of said product, must be added to the slurry before cooking. The added fat must be warm and flowable. No fat layer was observed in the final product after three months of storage. When oil seeds such as soya beans, peanuts, sunflower seeds are used as the starch source, no layering of the naturally occurring fat was observed for a period of three months. The added fat was used to replace part of the water.

The slurry should comprise from about 45% to about 85% water, and correspondingly from 15% to about 55% solids materials. Preferably the slurry comprises from about 60% to about 75% liquid and from about 25% to about 40% solids or in other words, from about 25% to about 40% of the whole starch source material which has been sized reduced. It is important that the solids level of the slurry be maintained within the ranges specified herein in order that a uniform slurry is obtained having good flow characteristics, excellent handling characteristics and suitable for easy use in subsequent processing steps mentioned herein. When the percentage of solids specified herein are not employed, stable product emulsions are often not obtained.

Slurrying can be accomplished in any conventional manner and a conventional batch liquid mixer may be employed or continuous mixing devices may be employed. The water utilized in the slurry may be warm water or cold water, the temperatures not being critical at this stage of the process. The fat used should be warm and flowable.

After mixing has continued to the point where the slurry is uniform and homogeneous, the slurried whole starch material is ready for the hydrothermal cooking step.

In the hydrothermal cooking step, the slurried whole starch source material, having a particle size as previously specified herein, is cooked to at least partially gelatinize the starch material. Cooking may be with or without pressure and the time limit of cooking is not critical as long as at least partial gelatinization occurs.

It is well known to those skilled in the art, gelatinization, or more accurately, the degree thereof, can be tested by conventional means.

If pressure is employed during the cooking process (15 P.S.I. is desirable), temperatures up to 250° F. can be conveniently employed during the cooking procedure. A preferred type of Hydrothermal cooker has been found to be a jet cooker since it nearly instantaneously cooks and partially gelatinizes the whole starch source material. Such a jet cooker generally comprises a jacketed pipe having a restricted orifice at one end. Steam is introduced through the jacket and the material to be cooked passes through the inner pipe.

A typical jet cooker is made and sold by Hydrothermal Corporation of Milwaukee, Wis. Very satisfactory results have been utilized when employing their Hydro-Heater 800 which has a through put capacity of 3678 gallons per hour, employs low pressure steam up to 100 P.S.I. in the jacket, cooks at temperatures within the range of 205° F. to 250° F. and will provide nearly instantaneous cooking and partial gelatinization of the starch material employed herein. Where other types of non-pressure cooking vessels are employed, it should be understood that longer process times may be necessary to achieve gelatinization of the starch material. For example, cooking times of up to one hour may be necessary at or near the boiling point of water.

After the hydrothermal cooking step has been completed, a small but effective amount of a starch digestible enzyme is added to the mixture. The purpose of the enzyme is to at least partially hydrolyze some of the cooked starch material with the result being partial conversion to sugars. The precise enzyme employed for this partial hydrolysis is not critical, although amylase is preferred. It should, however, be understood that a cellulase and protease may also be employed, or mixtures of cellulase, amylase and protease. The level of addition of the starch digestible enzyme may vary within the range of from about 0.01% to about 0.1% and is preferably within the range of from about 0.02% to about 0.08%. Very satisfactory results have been achieved with an enzyme addition level of 0.05%. The exact amount of enzyme is not critical, providing that a sufficient amount is added to achieve at least partial enzymatic hydrolysis of the cooked starch material to sugars.

It should be understood that the enzyme should not be added until the temperature of the cooked whole starch source material has decreased to at least 200° F. or lower. If the enzyme is added at above 200° F. the enzyme is often deactivated, killed or otherwise rendered inactive and ineffective for hydrolysis.

When the enzyme is added to the cooked whole starch slurry, it is preferably added under conditions of mixing. Mixing may be accomplished in any suitable mixer such as a Hobart mixer, a Ribbon blender, a paddlemixer, or the like. Mixing should continue for at least about five minutes, but no longer than 15 minutes. Preferred mixing time is from five minutes to ten minutes. During the mixing operation, while the enzyme is enzymatically hydrolyzing the cooked starch material, care must be taken to not undermix or overmix. If insufficient mixing is employed, the starch material will set up as a jell. Correspondingly, if mixing occurs for too long a period, the product will become thin and watery, making the achievement of a stable emulsion impossible. It has been found that where mixing times within the range specified herein are employed, good results from the standpoint of desirable product viscosity and emulsion stability are achieved. During this mixing step, it is desirable to maintain the product within a temperature range of from about 150° F. to about 200° F., and always below the boiling point.

After the simultaneous mixing ane enzymatic hydrolysis step has been completed, the enzyme must be deactivated before the product is ready for packaging and shipment. The enzyme may be deactivated by the addition of a deactivating mineral acid, such as hydrochloric acid, dilute sulfuric acid, phosphoric acid or the like. Preferably phosphoric acid is utilized as the enzyme deactivation acid since it also will function as a nutrient. The level of deactivating acid is not critical; however, satisfactory results have been attained when the enzyme deactivator is added at a level of from about ½% to about 1½% by weight.

Another ingredient must be added to the product prior to storage and shipment. This ingredient is a chemical preservative to inhibit mold and spoilage. Such preservatives generally comprise combinations of mineral acids and organic acids and may be added at levels of from about ¼% up to about 1% by weight. Other minor ingredients may be added to the product prior to storage and shipment and these minor ingredients include flavoring, coloring or the like.

In addition, a freezing point depressant may be added to the product such as salt at levels typically of about 1% by weight.

As heretofore mentioned, the product of this invention, providing it is made as described above and has the physical characteristics as described above, will provide an emulsion having good stability, excellent storage and handling capabilities including having a viscosity which is desirable from the standpoint of the ultimate product user. The product is not too thin and watery and yet is not so thick that it is not pourable. Moreover, it will provide shelf stability for certain instances up to as long as nine months, and more typically within the range of three to six months. A three to six month shelf stability is generally satisfactory in that the product is in most instances sold and consumed within this period of time.

The product may be employed as a straight feed in the condition in which it is sold, it may be mixed with a meal feed; it may be sprayed upon dry meal feeds or pelletized feeds, or it may be poured on dry feeds as a top dressing. In short, it may be fed in the same general ways as molasses is now utilized. Quite surprisingly, as mentioned heretofore, up to as much as 5% to 10% of a conventional dry grain feed in the form of a meal, pellets or the like, may be replaced with the liquid starch product of this invention on a dry weight basis without any significant decrease in animal weight gain and without any loss in feed efficiency or feed conversion. This will be demonstrated in the examples given below.

The following examples are offered to further illustrate, but not limit the process of this invention.

EXAMPLE 1

Whole corn kernels were obtained and a batch thereof was fed through a grain scalper to remove any adulterating materials. Thereafter, the whole kernel corn was size reduced in a hammer mill to a size of all of the particles passing through a 0.02 inch screen. The average particle diameter was found to be less than 300 microns as measured. Thereafter, water was added until the level was 70% water and 30% whole corn size reduced to the particle size specified above. This product was continually mixed, the water being at ambient conditions, until a uniform slurry was obtained. Thereafter, the product was fed through a hydrothermal jet cooker made by the Hydrothermal Corporation of Milwaukee, Wisconsin. The temperature attained was 250° F. and the product emitted from the jet cooker, which has jacketed steam maintained therearound at 100 psig., was found to be about 200° F. The product was examined and found to contain substantially completely gelatinized starch. The gelatinization occurred nearly instantaneously with the cooking in the hydro-cooker 800 as previously described. Thereafter, the product was fed into a batch mixer under heat exchange conditions to decrease the product temperature to about 150° F. Amylase enzyme was added at the level of 0.05% by weight and the mixer was continually operated for a five minute period. The mixer employed was a Sprout-Waldren mixer. After five minutes of mixing, 1% by weight of phosphoric acid was added and the product was cooled. After cooling, one-half percent of a preservative which comprised a mixture of proprionic acid, acetic acid and benzoic acid was added.

The product was found to be a yellowish colored stable emulsion which did not separate into layers. Examination of the product showed that the enzyme had partially converted the starch into sugars.

EXAMPLE 2

A study was conducted to determine the effect of replacing ground corn with the liquid hydrothermally processed and cooked whole starch product of this invention. The study was conducted to determine the effect on the growth rate, feed intake, and feed conversion of broiler chicks.

Day old broiler chicks were randomly divided into 24 lots of 10 chicks each. Three lots were randomly assigned to each of eight test diets. Cages were assigned to the lots at random. All birds were weighed at 0, 1, 2, 4, 6 and 8 weeks of age.

Composition of the test diets is shown in Table I below. A 24% protein, broiler starter diet served as control. The experimental diets were prepared by including five, ten or 15% (on a dry matter basis) of the liquid starch product of this invention substituted at the expense of the ground corn. One-half of each ration was pelleted and crumbled. The product of this invention as employed, was product prepared as described in Example 1 above.

All lots were fed control diet mash during the first week and then switched to their respective test diets. Collective weight gain, feed conversion and feed intake data were analyzed for significant differences.

The average cumulative weight gain data are presented in Table II. There were no significant differences in cumulative weight gain in any period. While total gains were similar or slightly lower on 5% and 10% substitution of the product of this invention for the ground corn diet, use of 15% substitution of the product of this invention resulted in the highest gain. In the case of 15% substitution, diet mash resulted in a slightly higher weight gain over the crumbles, while the reverse was true for all other diets.

The cumulative feed intake data are shown in Table III. There were no significant differences except in the second week. In the case of the control diet, total intake of the mash was over 300 grams more per bird than crumbles. For all other diets, this difference was much lower. This may indicate that some of the inherent benefits of pelletizing, i.e., less waste, easier handling, and better feed efficiency, were still obtained when the liquid starch product of this invention was employed in the diet.

Table IV shows the average cumulative feed conversion (feed/gain ratio). All the diets containing liquid starch product of this invention had a better feed conversion than the control mash diet. Here also, the improvement obtained by pelletizing diets containing the product of this invention is much lower than the improvement obtained by pelletizing the control diet.

While there are no significant differences in weight gains when using the control diets or the liquid starch product of this invention, the results of this study indicate that some of the benefits of pelletizing the control mash are still obtained by replacing part of the ground corn with the product of this invention.

TABLE 1

| Composition of Experimental Diets Used in the Chick Growth Study | | | | |
|---|---|---|---|---|
| | Control Diet | 5% LSP[b] Diet | 10% LSP Diet | 15% LSP Diet |
| Soybean meal, lbs. | 39.0 | 39.5 | 39.0 | 39.0 |
| Corn, ground, lbs. | 23.5 | 18.5 | 13.5 | 8.5 |
| Hydrothermally processed corn, lbs. | — | 15.0 | 30.0 | 45.0 |
| Sorghum grain, ground, lbs. | 22.5 | 22.5 | 22.5 | 22.5 |
| Alfalfa meal, lbs. | 2.5 | 2.5 | 2.5 | 2.5 |
| Fish meal, lbs. | 4.0 | 4.0 | 4.0 | 4.0 |
| Animal fat, lbs. | 5.0 | 5.0 | 5.0 | 5.0 |
| Dicalcium phosphate, lbs. | 1.0 | 0.8 | 0.6 | 0.4 |
| Limestone, ground, lbs. | 1.0 | 1.12 | 1.25 | 1.37 |

TABLE 1-continued

Composition of Experimental Diets Used in the Chick Growth Study

|  | Control Diet | 5% LSP[b] Diet | 10% LSP Diet | 15% LSP Diet |
|---|---|---|---|---|
| Salt, lbs. | 0.5 | 0.5 | 0.5 | 0.5 |
| Vitamin A(10,000 IU/g), g | 20.0 | 20.0 | 20.0 | 20.0 |
| Vitamin $D_3$ (15,000 IU/g), g | 8.0 | 8.0 | 8.0 | 8.0 |
| Vitamin $B_{12}$(20mg/lb), g | 10.0 | 10.0 | 10.0 | 10.0 |
| B-Complex (1233), g | 45.0 | 45.0 | 45.0 | 45.0 |
| D-L-Methionine, g. | 35.0 | 35.0 | 35.0 | 35.0 |
| Choline chloride (50%), g | 40.0 | 40.0 | 40.0 | 40.0 |
| Trace mineral mix(Z-10), g | 23.0 | 23.0 | 23.0 | 23.0 |
| Corn, ground, g. | 273.0 | 273.0 | 273.0 | 273.0 |

[a]One-half of each diet was pelleted and crumbled.
[b]hydrothermally processed corn containing 30% dry matter, 1% phosphoric acid, and 0.5% propionic acid.
LSP = liquid starch product of this invention processed as described in Example 1 containing 30% whole corn, 17% phosphoric acid, enzyme deactivated and 0.5% propionic acid.

TABLE 2
AVERAGE CUMULATIVE WEIGHT GAIN (GRAMS PER BIRD)

|  | Control | 5% LSP | 10% LSP | 15% LSP |
|---|---|---|---|---|
| 0-1 week (all groups were fed control mash during this period) | | | | |
| Mash | 81.3 | 79.0 | 76.7 | 80.3 |
| Crumbles | 84.3 | 77.3 | 80.0 | 79.3 |
| Average | 82.8 | 78.2 | 78.4 | 79.8 |
| 0-2 Weeks | | | | |
| Mash | 249.3 | 246.0 | 232.0 | 246.0 |
| Crumbles | 253.0 | 245.0 | 243.3 | 252.3 |
| Average | 251.0 | 245.5 | 237.7 | 249.0 |
| 0-4 Weeks | | | | |
| Mash | 806.0 | 820.7 | 781.0 | 823.7 |
| Crumbles | 836.3 | 822.0 | 816.3 | 835.0 |
| Average | 821.2 | 821.4 | 798.7 | 829.4 |
| 0-6 Weeks | | | | |
| Mash | 1535.7 | 1565.3 | 1479.1 | 1658.7 |
| Crumbles | 1578.0 | 1568.0 | 1595.3 | 1618.7 |
| Average | 1556.9 | 1566.7 | 1537.5 | 1638.7 |
| 0-8 Weeks | | | | |
| Mash | 2272.7 | 2282.7 | 2226.3 | 2356.7 |
| Crumbles | 2344.0 | 2310.7 | 2254.0 | 2346.7 |
| Average | 2308.4 | 2296.7 | 2240.2 | 2351.7 |

TABLE 3
AVERAGE CUMULATIVE FEED INTAKE (GRAMS/BIRD)

|  | Control | 5% LSP | 10% LSP | 15% LSP |
|---|---|---|---|---|
| 0-1 Week (All groups were fed control mash during this period) | | | | |
| Mesh | 106.3 | 106.3 | 106.7 | 109.0 |
| Crumbles | 117.7 | 108.7 | 113.3 | 111.0 |
| Average | 112.0 | 107.5 | 110.0 | 110.0 |
| 0-2 Weeks | | | | |
| Mash | 343.0 | 379.7 | 418.3 | 419.3 |
| Crumbles | 361.0 | 309.7 | 398.0 | 378.0 |
| Average | 352.0 | 34.7 | 408.2 | 398.7 |
| 0-4 Weeks | | | | |
| Mash | 1377.0 | 1460.7 | 1341.3 | 1439.0 |
| Crumbles | 1356.7 | 1427.7 | 1405.3 | 1388.3 |
| Average | 1366.9 | 1444.2 | 1373.3 | 1413.7 |
| 0-6 Weeks | | | | |
| Mash | 3853.7 | 3803.0 | 3648.7 | 3923.3 |
| Crumbles | 3647.7 | 3757.7 | 3696.7 | 3827.0 |
| Average | 3750.7 | 3780.4 | 3672.7 | 3875.2 |
| 0-8 Weeks | | | | |
| Mash | 6022.3 | 5943.7 | 5757.7 | 6095.0 |
| Crumbles | 5699.0 | 5949.0 | 5752.3 | 5927.3 |
| Average | 5860.7 | 5946.4 | 5755.0 | 6011.2 |

TABLE 4
AVERAGE CUMULATIVE FEED CONVERSION (FEED/GAIN)

|  | Control | 5% LSP | 10% LSP | 15% LSP |
|---|---|---|---|---|
| 0-1 Week (All groups were fed control mash during this period) | | | | |
| Mash | 1.312 | 1.352 | 1.389 | 1.360 |
| Crumbles | 1.328 | 1.406 | 1.429 | 1.398 |
| Average | 1.320 | 1.379 | 1.409 | 1.379 |
| 0-2 Weeks | | | | |
| Mash | 1.374 | 1.546 | 1.806 | 1.697 |
| Crumbles | 1.427 | 1.265 | 1.638 | 1.501 |
| Average | 1.401 | 1.406 | 1.722 | 1.599 |
| 0-Weeks | | | | |
| Mash | 1.708 | 1.780 | 1.719 | 1.745 |
| Crumbles | 1.622 | 1.736 | 1.721 | 1.663 |
| Average | 1.665 | 1.758 | 1.720 | 1.704 |
| 0-6 Weeks | | | | |
| Mash | 2.511 | 2.431 | 2.476 | 2.365 |
| Crumbles | 2.315 | 2.397 | 2.317 | 2.365 |
| Average | 2.413 | 2.414 | 2.397 | 2.365 |
| 0-8 Weeks | | | | |
| Mash | 2.651 | 2.604 | 2.586 | 2.585 |
| Crumbles | 2.432 | 2.574 | 2.553 | 2.527 |
| Average | 2.542 | 2.589 | 2.570 | 2.556 |

As can be seen, the invention accomplishes all of its stated objects. A stable emulsion product is obtained, the product is an effective feed, and the product can be effectively substituted for dry feeds resulting in some animal weight gains at less cost.

I claim:

1. An animal feed, which consists essentially of from about 90% to about 95% of dry feed material, and from about 5% to about 10% on a dry weight basis of a stable emulsified liquid starch product that is substantially free of non-protein nitrogen additives which comprises from about 45% to about 85% by weight edible liquid, and from about 15% to about 55% by weight of a whole starch bearing material emulsified with said edible liquid and from about ¼ to about 1% of a preservative mixture for mold prevention to provide an emulsion which is stable for at least 3 to 6 months and yet which is still conveniently pourable, said starch bearing material being cooked, gelatinized and at least partially enzymatically hydrolyzed the predominant proportior of the particles of said emulsion not exceeding an average particle diameter of 300 microns.

2. The product of claim 1 wherein said product is from about 60% to about 75% edible liquid, and from about 25% to about 40% starch bearing material.

3. The product of claim 1 wherein all of said particles have an average particle diameter of 300 microns or smaller.

4. The product of claim 1 wherein said product includes from about ½% to about 1½% by weight of a mineral acid, enzyme deactivator.

5. The product of claim 4 wherein said mineral acid is a nutrient mineral acid.

6. The product of claim 5 wherein said mineral acid is phosphoric acid.

7. The product of claim 1 wherein said preservative mixture is for mold prevention and comprises a mixture of organic and mineral acids.

8. The product of claim 1 wherein the viscosity of said product is such that said product is easily handleable, has controllable flow rates, and yet said product is still pourable.

9. The product of claim 1 wherein said starch bearing material is a grain.

10. The product of claim 1 wherein said starch bearing material is corn.

11. The product of claim 1 wherein said starch bearing material is selected from the group consisting of grains and tubers.

12. The product of claim 1 wherein the product includes about 1% by weight of an edible freezing point depressant which is soluble in said edible liquid.

13. The product of claim 12 wherein said freezing point depressant is salt.

14. The product of claim 12 wherein a portion of the edible liquid is replaced with triglyceride fat material.

15. The product of claim 14 wherein the amount of said fat material is from 0.5% to about 25% by weight.

16. The product of claim 1 wherein a portion of the edible liquid is replaced with triglyceride fat material.

17. The product of claim 16 wherein the amount of said fat material is from 0.5% to about 25% by weight.

18. A method of feeding monogastric animals, ruminants and pseudo-ruminants wherein said animals achieve a feed efficiency and weight gain substantially equal to the results obtained on dry feed diets, said metnhod comprising replacing from about 5% to about 10% on a dry weight basis of said animals feed with a stable emulsified liquid starch product which is substantially free of non-protein nitrogen additives and consists essentially of from about 45% to about 85% by weight edible liquid, and from about 15% to about 55% by weight of a whole starch bearing material and from about ¼% to about 1% of a preservative mixture for mold prevention, emulsified with said edible liquid to provide an emulsion which is stable for at least 3 to 6 months, and yet which is still conveniently pourable, said starch bearing material being cooked, gelatinized and at least partially enzymatically hydrolyzed, the predominant proportion of the particles of said emulsion not exceeding an average particle diameter of 300 microns.

* * * * *